United States Patent [19]

Baldelli

[11] 4,401,228

[45] Aug. 30, 1983

[54] MECHANISM FOR RAPID AND HERMETIC CLOSING OF CERAMIC CONTAINERS

[75] Inventor: Massimo Baldelli, Citta' di Castello, Italy

[73] Assignee: Ceramiche di Riosecco dei Figli de Dante Baldelli & C. S.n.c., Citta' di Castello, Italy

[21] Appl. No.: 365,568

[22] Filed: Apr. 5, 1982

[30] Foreign Application Priority Data

Jan. 15, 1982 [IT] Italy ............................ 47581 A/82

[51] Int. Cl.$^3$ ............................................. B65D 53/00
[52] U.S. Cl. .................................... 220/235; 215/360
[58] Field of Search ...................... 220/235, 233, 234; 215/360

[56] References Cited

U.S. PATENT DOCUMENTS 2,462,445  2/1949  Weiss ................................ 215/360
2,753,074  7/1956  Schmid ............................. 220/235

FOREIGN PATENT DOCUMENTS 33835   10/1963  Finland ............................... 220/235
206067   7/1966  Sweden .............................. 215/360

*Primary Examiner*—George T. Hall
*Attorney, Agent, or Firm*—McAulay, Fields, Fisher, Goldstein & Nissen

[57] ABSTRACT

A ceramic cover (1) has a metal bottom (3) equipped with a support (9) with a pin (12) with a very broad spiral threading (13) on its lower part; said pin is held in hole (11) on the top (10) of support (9) with considerable slack. The peripheral edge (5) of the bottom holds a rubber ring (4), which is concave on the inside (2) and grooved (4') on the external surface, with a protruding molding (7) for the cover (1) to rest on. The upper part (14) of pin (12) is knurled to ensure its adhesion with glue to the ceramic handle (16). Even though the ceramic pieces are rounded, the seal is hermetic as well as aesthetically pleasing, since no non-ceramic part is visible. Opening and closing are rapid, requiring only ¾ of a turn (FIG. 2).

10 Claims, 3 Drawing Figures

U.S. Patent
Aug. 30, 1983
4,401,228
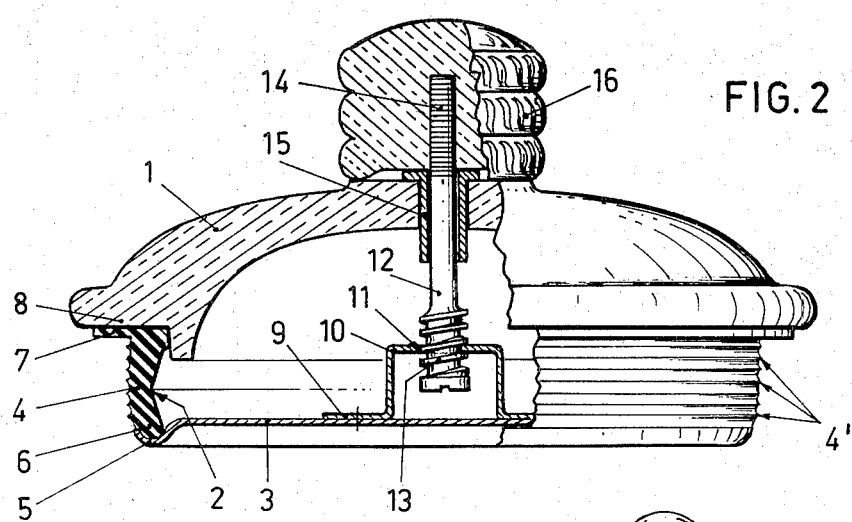
FIG. 2
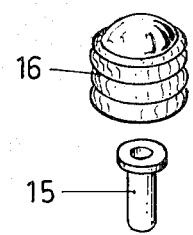
FIG. 3
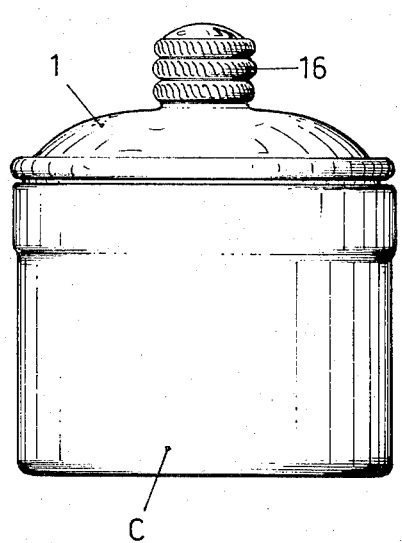
FIG. 1
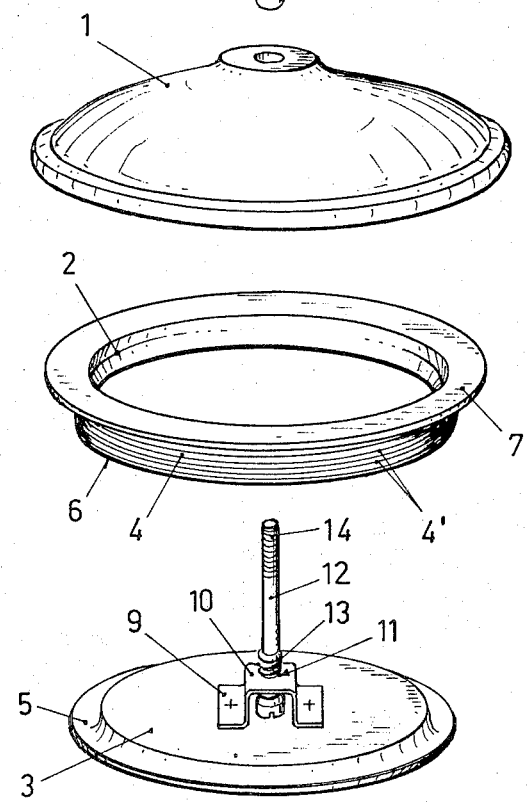

MECHANISM FOR RAPID AND HERMETIC CLOSING OF CERAMIC CONTAINERS

This invention involves a mechanism for rapidly and hermetically closing ceramic containers, independently of the diameter of the container opening.

Ceramic containers with covers have been used for so long that an enormous number of various types are known. However, none of these versions allow rapid and hermetic closing while still respecting the aesthetic requirement that no non-ceramic element be visible. Nor do any of these versions offer simplicity with regard to the mechanism used and to the maneuverability and reliability of the seal, as well as economy. Thus no current solutions offer all the above characteristics and so may be considered of interest commercially.

It should be noted that it is almost impossible to manufacture ceramic containers and covers in series, with constant dimensions and no deformations. During drying and firing the actual properties of the material lead to unpredictable shrinkage and rounding of the edges. Therefore, although many methods can theoretically guarantee a hermetic seal, only those based on the deformability of an elastic material can in practice afford hermetic, hygienic and rapid closing and opening. These are thus limited to methods based on pressure or expansion.

Pressure-based methods are unacceptable in that they require a visible mechanism which cannot meet the aesthetic requirement that non-ceramic parts (metal, rubber, plastic, etc.) be invisible. Therefore, only the expansion method remains a possibility.

This method is at least known in principle, since it has been used for some time to hermetically seal thermos containers. However, it cannot simply be transferred to ceramic covers where the need for hermetic seals, rapid opening and closing, and aesthetics requires that no visible element of the mechanism disturb the appreciation of the container.

First of all, a thermos expansion cap is designed to adhere to the internal surface of the neck of the glass container, which is normally very thin (30/40 mm) and also perfectly circular. However, a practical ceramic container must have a sufficiently large opening for a hand to fit (approximately 100 m). Furthermore, as noted above, the opening in a ceramic container is almost always rounded and uneven in size. A thermos-type system based on the movement of a threaded pin screwing into a slot allowing no oscillations, leads to a mechanism with no slack. This rigidity prevents the element equipped with the gasket to press against the walls of the container from responding to the irregularity of the opening.

Secondly, unlike a thermos, a ceramic container is used for ingredients to be cooked, and so requires several openings and closings during the day. Therefore, passage from one position to another must be rapid. Opening and closing of thermos screw caps involves a long operation of several turns for both.

Thirdly, thermos screw caps have no stops to prevent rotation of the knob beyond a given point. At a certain point, some components of the mechanism fall inside the thermos.

Fourthly, in a thermos the aesthetics of the top are not important. The top has only one simple function, since it is hidden by the glass which is turned over and screwed on. For example, the knob and the threaded pin of the screw system are not separable, and so no changes to the knob or the actual closing element are possible in practice.

The aim of this invention is thus to realize a closure for ceramic containers with any shape openings, which, while avoiding the problems mentioned above, guarantees: a hermetic seal of said containers adhering perfectly to their opening, despite the rounding and irregularity arising during drying and firing; a rapid opening and closing in a fraction of a turn; no dropping of mechanism components inside the container; the undamaged aesthetics of the containers, by hiding all components.

The invention achieves this aim with a rapid and hermetic closing mechanism independent of the diameter of the container, characterized by:

a ceramic cover with a circular raised edge along its internal surface, forming one whole piece, smaller in diameter than both the outside of said cover and of the container;

a rubber ring, the outside of which is in perfect contact with said circular edge, with the diameter of its external edge slightly smaller than that of the container, and its upper edge protruding to form a support for the lower edge of said cover; the lower is grooved in steps to form a seal with an underlying metal disk;

a metal disk with grooves on the edge to form a seal with said grooved molding of said rubber ring, equipped with a support with an opening in the center for a pin which engages in said opening with its bottom threaded section.

The fundamental concept of the invention thus consists of an expansion closing for ceramic containers, which, in view of the shrinkage and rounding mentioned above, is guaranteed hermetic by the slack between the spiral part of the pin and its place in the opening of the support. This slack allows the ceramic cover to assume, through the rubber ring, the position guaranteeing the best contact between the rubber and the ceramic container.

According to the invention, the spiral shape of said pin allows the rubber gasket to be tightened or loosened by only a $\frac{3}{4}$ turn of the knob on the cover, whatever the diameter of the container.

According to the invention, the bottom of the spiral shaped pin hits the lower surface of the top of the support at the end of its movement to loosen the gasket. All components of the mechanism remain attached to one another, to render the closing even more reliable.

In this invention, the upper part of said pin with rough threading is passed through a central opening in the upper part of the ceramic cover, covered with a small plastic bushing. The part protruding beyond the ceramic cover is joined to the knob using common paste.

Finally, the invention provides that the edge of the rubber ring is grooved so as to better adhere to the opening of the ceramic container, and that its internal peripheral surface is concave to facilitate expansion during closing.

The advantages of the closing according to the invention are quite clear in light of the preceding discussion. The closing system has no mechanical part visible when the container is closed, guarantees a hermetic seal despite the shrinkage and rounding of the ceramic parts during firing, and allows rapid opening with only a $\frac{3}{4}$ turn of the knob whatever the diameter of the container.

The object of this invention is described below in detail with reference to a preferred embodiment shown in a purely exemplificative and non-limiting way in the attached drawing.

FIG. 1 shows a side view of a ceramic container with the closing according to this invention.

FIG. 2 shows a partial cross section view of a ceramic cover incorporating the closing mechanism according to this invention.

FIG. 3 shows an exploded view of the individual parts comprising the closing mechanism according to this invention.

FIG. 1 shows ceramic container C with ceramic cover 1 incorporating the closing mechanism according to this invention. No part of the mechanism is visible, and so the aesthetics of the ceramic object are completely preserved.

FIG. 2 shows only cover 1 incorporating the closing mechanism according to this invention. Metal disk 3 on the bottom and rubber ring 4 with grooves 4′ for better adhesion to the opening of container C are also shown.

FIG. 3 shows all the elements of the closing mechanism according to this invention. Metal disk 3 is equipped with peripheral groove 5 for peripheral stepped molding 6 of rubber ring 4 to form a seal. The top of rubber ring 4 has a protruding edge 7 to support the upper surface of cover 1 forming a single piece with circular edge 8 protruding from it. This circular edge 8 in turn presses on rubber ring 4. Furthermore, the concave internal surface 2 of rubber ring 4 facilitates its expansion in closing.

Support 9 is attached to metal disk 3, with an opening 11 in the center of its top 10. Pin 12 passes through said opening, with its head below top 10 and its diameter greater than that of opening 11, to act as a stop and to prevent pin 12 from coming out of support 9 when the seal is opened and ceramic cover 1 is removed. The head of pin 12 is spiral shaped 13 to make both closing and opening rapid movements. The top part 14 of pin 12 is knurled, and said knurled part passes through plastic bushing 15 in cover 1 and is fixed inside knob 16 using common glue to join them together.

Ceramic cover 1 equipped with the closing mechanism according to this invention is inserted in the opening of ceramic container C. At this point, a ¾ turn of knob 16 is sufficient to hermetically close the container. Rubber ring 4 between metal disk 3 and ceramic cover 1 is compressed, and its peripheral grooved 4′ is expanded out to adhere perfectly to the peripheral surface of the opening of container C, because the slack between the spiral part 13 of pin 12 and opening 11 in the top 10 of support 9 compensates for the rounding of the opening.

No component of the mechanism is visible when the container is closed.

Of course, the materials used for the mechanism according to this invention must be classified as safe for food, and the mechanism described is independent of the shape of the container opening. The mechanism itself has been described and illustrated with reference to a possible embodiment, although variations in proportions and dimensions will not bring it outside the bounds of the invention.

I claim:

1. A closure mechanism for a ceramic container, comprising:
    a ceramic cover having a circular raised edge part along its internal surface and a lower edge part depending therefrom, said lower edge having a diameter smaller than the outer diameter of said circular raised edge and smaller than an interior diameter of the side of said container;
    a rubber ring having a first portion in mating contact with said circular raised edge, and a second portion connected with said first portion and abutting against said lower edge;
    said first portion having an outer edge whose diameter is less than an outer diameter of said container but greater than said interior diameter of the side of said container and less than the diameter of an outer edge of said circular raised edge part, said first portion forming a support for said circular raised edge part;
    said second portion including a peripheral stepped molding base;
    a metal disc including a base having an outer edge with a peripheral grooved edge forming a seal with said peripheral stepped molding base; and
    adjustment means connecting said metal disc and said ceramic cover for adjusting the position of said metal disc relative to said ceramic cover to vary the diameter of said rubber ring for expansion thereof to seal said ceramic cover to said ceramic container and to contract said rubber ring to facilitate removal of said ceramic cover from said ceramic container.

2. The closure mechanism of claim 1, wherein said adjustment means includes:
    a support connected with said metal disc, said support and said cover each having an opening forming a pair of aligned openings; and
    a pin extending through said aligned openings to control the movement of said base of said metal disc externally of said cover.

3. Mechanism as claimed in claim 2, wherein said pin has a lower part with very broad spiral threading.

4. Mechanism as claimed in claim 3, wherein said support includes a raised part raised above said metal disc, said opening in said support being in said raised part to provide an area between said raised part and said metal disc, and said lower part with said spiral threading being held in said last-mentioned opening and for positioning in said area.

5. Mechanism as claimed in claim 3, including an enlarged head on said lower part, said enlarged head having a diameter greater than said opening in said support for pressing against a lower surface of the top of said support.

6. Mechanism as claimed in claim 2, wherein said pin includes an upper part which extends through said opening in said cover, and a knob fixed to said upper part externally of said cover for rotation of said pin externally of said cover.

7. Mechanism as claimed in claim 1, wherein said second portion of said rubber ring includes an external peripheral grooved surface.

8. Mechanism as claimed in claim 1, wherein said rubber ring has a concave internal peripheral surface.

9. A closure mechanism for a ceramic container, comprising:
    a ceramic cover having a raised edge and a lower edge depending therefrom, said lower edge having a diameter smaller than the outer diameter of said raised edge and smaller than an interior diameter of the side of said container;
    an elastic rubber ring including a first portion and a second portion transverse thereto, said first portion being in contact with said raised edge and said second portion abutting against said lower edge;

said first portion having an outer edge whose diameter is less than an outer diameter of said container but greater than said interior diameter of the side of said container and less than the diameter of an outer edge of said raised edge, said first portion forming a support for said raised edge; and said second portion including a peripheral stepped molding base;

a metal disc including a base having an outer edge with a peripheral edge in contact with said peripheral stepped molding base to form a seal therewith; and adjustment means connecting said metal disc and said ceramic cover for adjusting the position of said metal disc relative to said ceramic cover to vary the diameter of said rubber ring for expansion thereof to seal said ceramic cover to said ceramic container and to contract said rubber ring to facilitate removal of said ceramic container.

10. The closure mechanism of claim 9, wherein said adjustment means includes:

a support connected with said metal disc, said support and said cover each having an opening forming a pair of aligned openings; and a pin extending through said aligned openings to control the movement of said base of said metal disc externally of said cover; and said first portion of said elastic rubber ring includes a concave internal surface to facilitate expansion in closing and an outer grooved surface cooperating with said concave internal surface;

said pin upon rotation thereof moving said first portion for expansion and contraction thereof in a direction transverse to the axial extent of said pin, said pin being sloped to provide a tightening and loosening of said rubber ring with only a three-quarter turn.

* * * * *